United States Patent
Chen

(10) Patent No.: US 7,054,973 B2
(45) Date of Patent: May 30, 2006

(54) COMPUTER SYSTEM WITH COLLAPSIBLE KEYBOARD AND ALTERNATE DISPLAY FUNCTIONS AND PROCESSING METHOD THEREOF

(75) Inventor: Chin Hsiang Chen, Taipei (TW)

(73) Assignee: Mitac Technology Corp., Hsin-Chu Hsien (TW)

( * ) Notice: Subject to any disclaimer, the term of this patent is extended or adjusted under 35 U.S.C. 154(b) by 252 days.

(21) Appl. No.: 10/386,789

(22) Filed: Mar. 12, 2003

(65) Prior Publication Data

US 2004/0093449 A1    May 13, 2004

(30) Foreign Application Priority Data

Nov. 12, 2002  (TW)  ................ 91133184 A

(51) Int. Cl.
*G06F 13/00* (2006.01)
*G06F 13/24* (2006.01)

(52) U.S. Cl. ............ 710/260; 710/100; 361/680
(58) Field of Classification Search ............ 710/100, 710/260; 361/680
See application file for complete search history.

(56) References Cited

U.S. PATENT DOCUMENTS

| | | | |
|---|---|---|---|
| 5,189,632 A | | 2/1993 | Paajanen et al. |
| 5,267,127 A | * | 11/1993 | Pollitt ........................ 361/680 |
| 5,754,798 A | * | 5/1998 | Uehara et al. ............ 710/104 |
| 5,937,200 A | * | 8/1999 | Frid et al. ................... 710/264 |
| 5,973,666 A | | 10/1999 | Challener et al. |
| 5,986,586 A | | 11/1999 | Tsai |
| 6,020,878 A | | 2/2000 | Robinson |
| 6,128,117 A | * | 10/2000 | Kim ........................... 398/115 |
| 6,137,676 A | * | 10/2000 | Merkel ....................... 361/680 |
| 6,587,096 B1 | * | 7/2003 | Bullister ..................... 345/168 |
| 6,741,455 B1 | * | 5/2004 | Karidis et al. ............. 361/680 |
| 6,812,920 B1 | * | 11/2004 | Otsuka ....................... 345/211 |

FOREIGN PATENT DOCUMENTS

| | | |
|---|---|---|
| DE | 19741453 | 3/1999 |
| JP | 7-36222 | 4/1995 |
| JP | 11-512890 | 2/1999 |
| JP | 2002-084351 | 3/2002 |
| JP | 2003-271280 | 9/2003 |
| JP | 2004-078943 | 3/2004 |
| TW | 468838 | 12/2001 |
| WO | WO9712470 | 4/1997 |

* cited by examiner

*Primary Examiner*—Rehana Perveen
*Assistant Examiner*—Christopher Daley
(74) *Attorney, Agent, or Firm*—Quintero Law Office

(57) ABSTRACT

A computer system with collapsible keyboard and alternate display functions. The computer system includes a main body which stores at least one application. A monitor and collapsible keyboard are coupled to the main body, the keyboard disposable in an open operating position and a folded position. A signal generating device is coupled to both the collapsible keyboard and the main body to generate a first signal when the keyboard is folded. A keyboard controller is integrated into the main body to receive the first signal. An interrupt request controller in the main body is coupled to the keyboard controller to send a first interrupt request when in the folded position.

15 Claims, 6 Drawing Sheets

COMPUTER SYSTEM WITH COLLAPSIBLE KEYBOARD AND ALTERNATE DISPLAY FUNCTIONS AND PROCESSING METHOD THEREOF

BACKGROUND OF THE INVENTION

1. Field of the Invention

The present invention relates to a computer system with collapsible keyboard and alternate display function and processing method thereof. In particular, the present invention relates to a method and system for a collapsible keyboard activating an application on a designated partial area of the system monitor.

2. Description of the Related Art

As personal computers have increased in power and decreased in size, portable computers have also become more useful and powerful. Modern computer systems require complicated steps to perform designated functions.

Generally, characters and symbols are input into a computer with a keyboard. Other input devices such as mouse pointers or light pens fail to offer input speed and ease to match the keyboard. Therefore, the popularity of keyboards remains universal.

Portable users require computer systems with slim, simple interfaces, easily transported between locations. Thus, there is a need for system with a collapsible keyboard and display capability compatible with portability.

SUMMARY OF THE INVENTION

Accordingly, an object of the invention is to provide a computer system capable of performing applications when a collapsible keyboard is in a folded position, displaying application data on a designated partial area of the system monitor not obscured by the folded keyboard.

Another object of the invention is to provide a method for performing computer system applications when a collapsible keyboard is in a folded position, displaying application data on a designated partial area of the system monitor not obscured by the folded keyboard.

A detailed description is given in the following embodiments with reference to the accompanying drawings.

To achieve the above object, the present invention provides a computer system with collapsible keyboard and alternate display functions and processing method thereof.

According to an embodiment of the invention, the computer system includes a main body, a monitor, a collapsible keyboard, a signal generating device, a keyboard controller, and an interrupt request controller.

A main body stores at least one application. A monitor is coupled to the main body. A collapsible keyboard is coupled to the main body, disposable in both an open operating position and a folded position. It is noted that the collapsible keyboard may obscure a portion of the display when in the folded position. A signal generating device is coupled to both the collapsible keyboard and the main body to generate a first signal when the keyboard is in folded position. A keyboard controller is integrated into the main body for receiving the first signal, determining if the collapsible keyboard has been folded. An interrupt request controller in the main body is coupled to the keyboard controller to send a first interrupt request when the collapsible keyboard is folded, stop any active system applications, and execute at least one new application, displaying application data on a designated partial area of the system monitor not obscured by the folded keyboard.

According to another embodiment of the invention, a method of processing a collapsible keyboard and alternate display functions is provided.

First, a computer system provides a monitor and a collapsible keyboard, disposed at least in an open operating position and a folded position. Then, a signal generating device generates a first signal when the collapsible keyboard is folded. A keyboard controller receives the first signal. Thereafter, the keyboard controller initiates an interrupt request controller according to the first signal determining if the collapsible keyboard has been folded. An interrupt request controller sends a first interrupt request to stop any active applications in the computer system. Finally, the computer system executes an application, displaying application data on a designated partial area of the system monitor not obscured by the folded keyboard.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
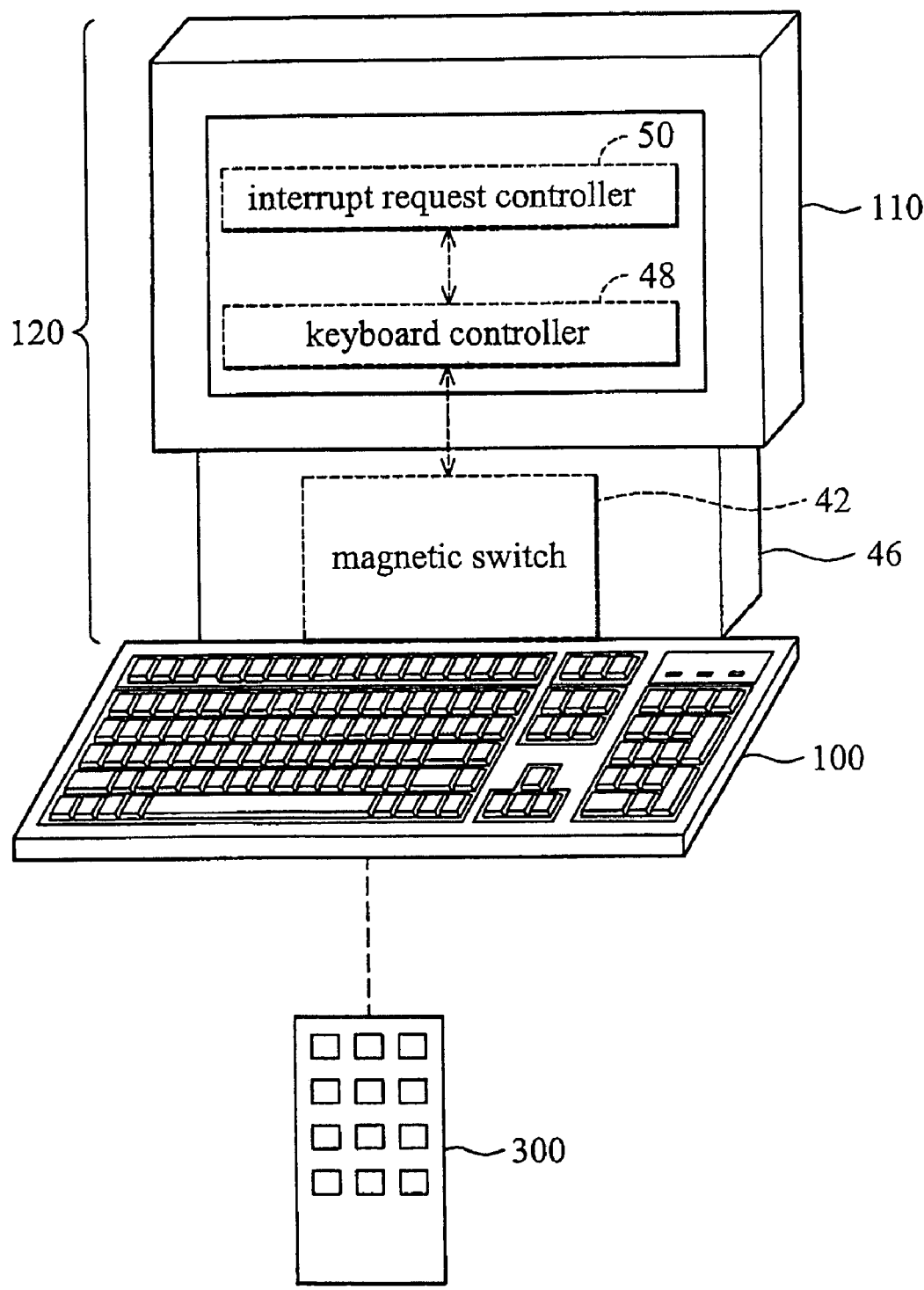
FIG. 1 is a schematic diagram showing the architecture of the apparatus for a computer system with collapsible keyboard and alternate display functions.

FIG. 1 is a schematic diagram showing the architecture of the apparatus for a computer system with collapsible keyboard and alternate display functions.

The apparatus includes a main body 120, a monitor 110, a collapsible keyboard 100, a magnetic switch 42, a signal generating device 46, a keyboard controller 48, and an interrupt request controller 50. A remote control 300 may also be provided.

Figure 2:
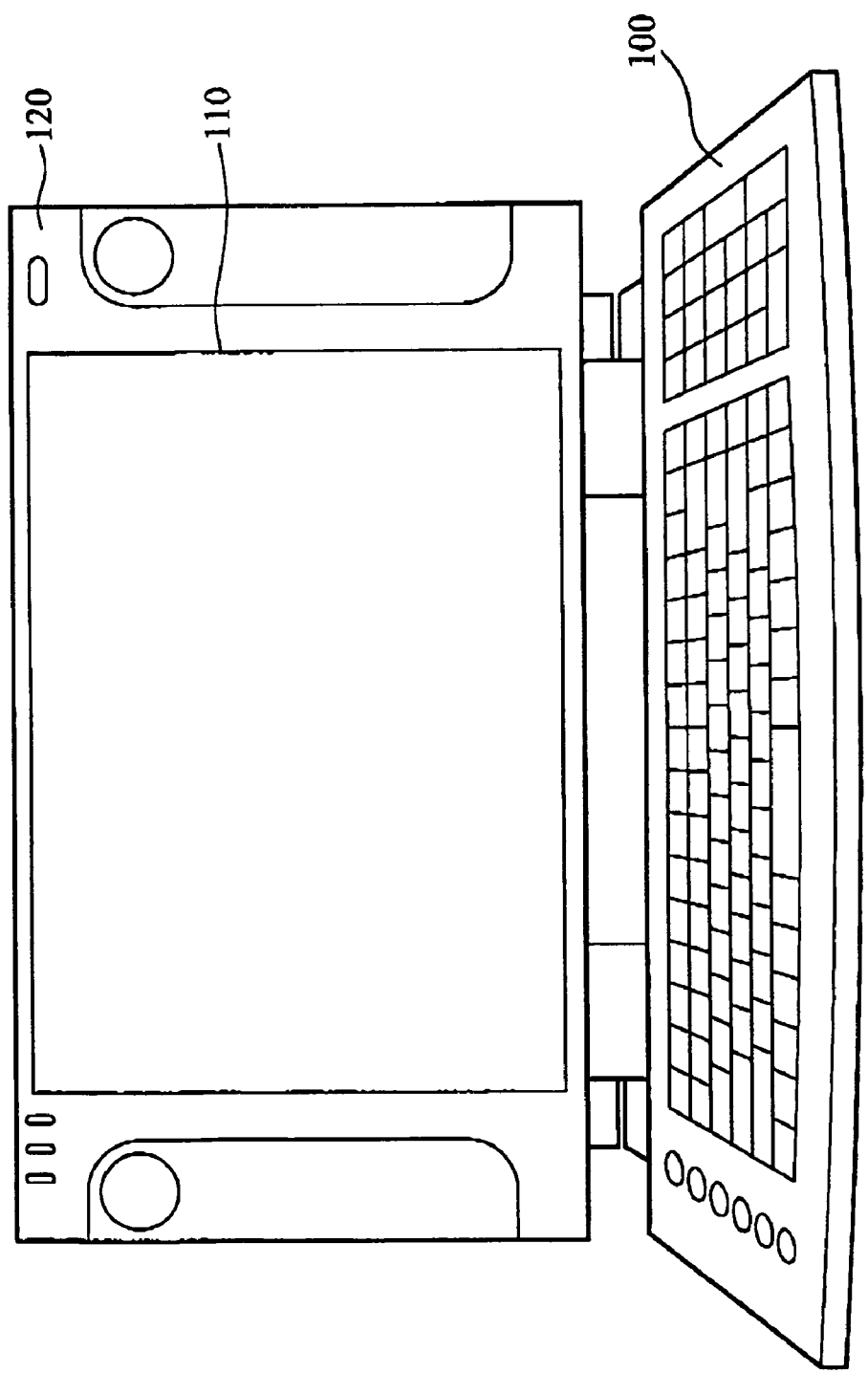
FIG. 2 is a schematic view showing a computer system in an operational state.
Figure 3:
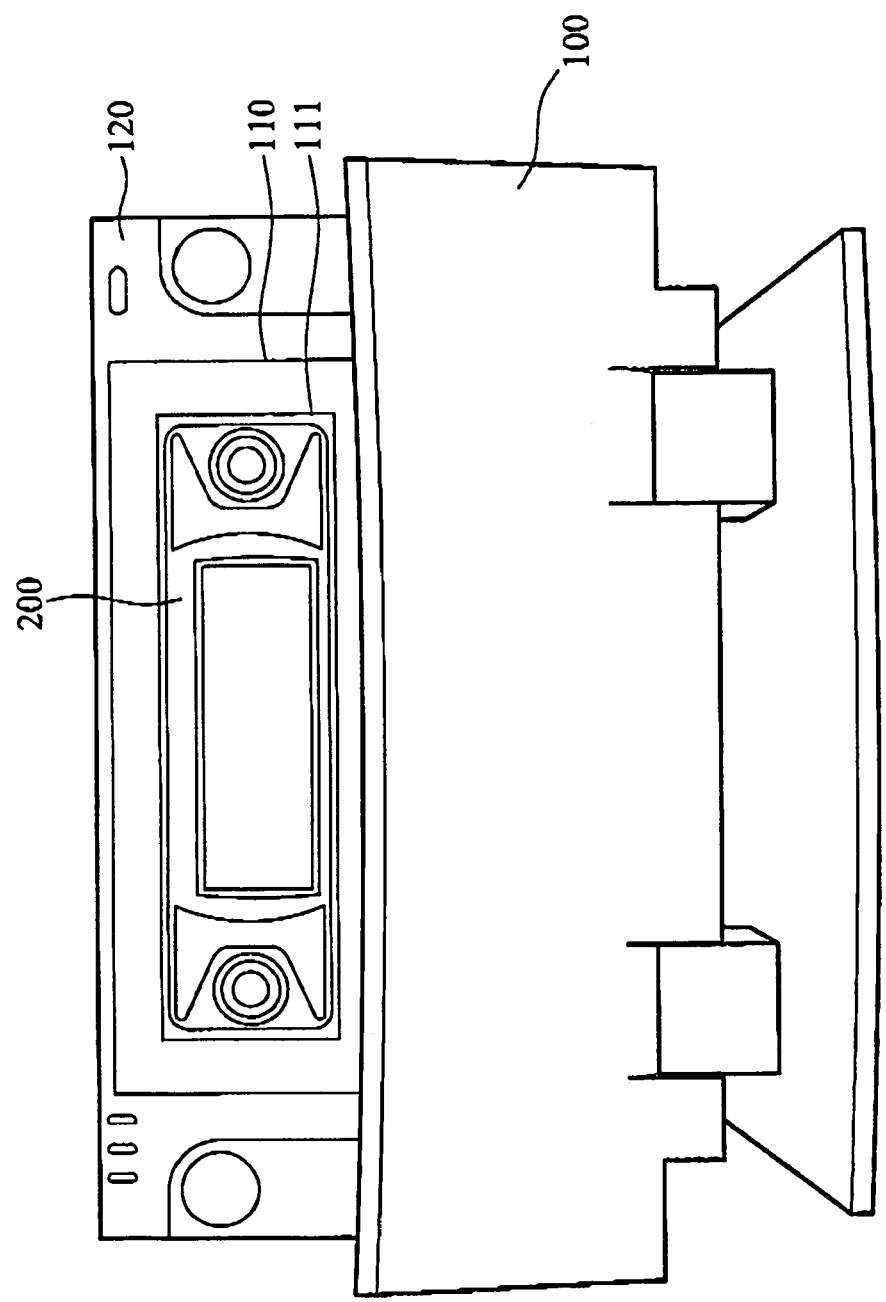
FIG. 3 is a schematic view showing a computer system in a collapsed position executing a MP3 player application.

FIG. 2 is a schematic view showing a computer system in an open operating position and FIG. 3 is a schematic view showing a computer system in a folded position executing a MP3 player application. When the collapsible keyboard 100 is folded, the magnetic switch 42 coupled to both the collapsible keyboard 100 and main body 120 is activated, subsequently driving a signal generating device 46 to issue a first signal.

The keyboard controller 48 receives the first signal according to the first signal power on an interrupt request controller 50. The interrupt request controller 50 follows priority order, sending the parameters of the interrupt request to the CPU. The CPU stops any active applications in the computer system. In the folded state, applications are only displayed on designated partial area of the system monitor 110 not obscured by the folded keyboard 100. A remote control 300 may be used to execute and control the application.

Figure 4:
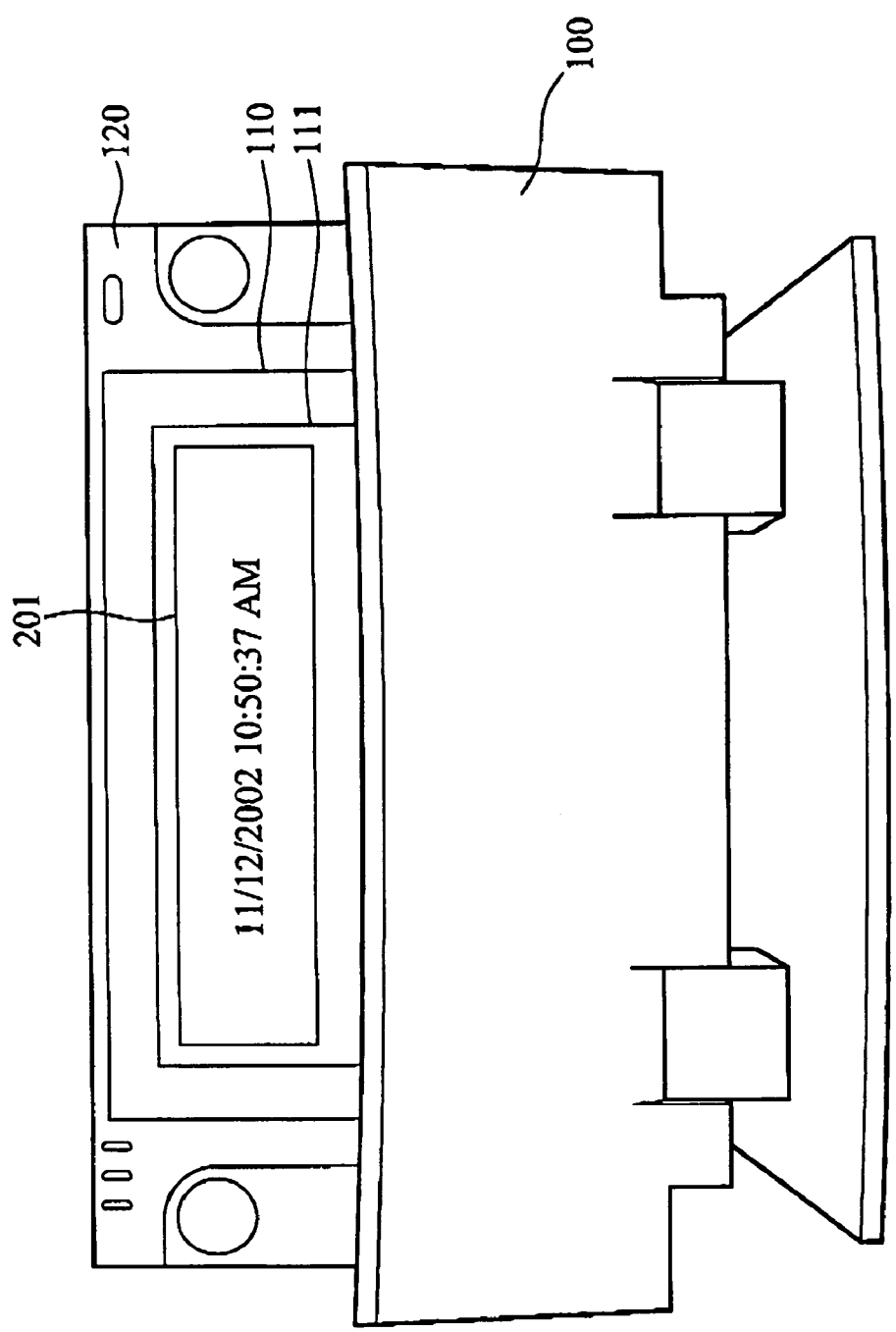
FIG. 4 is a schematic view showing a computer system in a folded position executing a clock application.

FIG. 3 is a schematic view showing the computer system in a folded position executing a MP3 player application 200 displayed on a designated partial area 111 of the system monitor not obscured by the folded keyboard. Function keys of the remote control 300 control the application or switch between applications. FIG. 4 is a schematic view showing a computer system in a folded position executing a clock application 201. Other applications can include music, audio information, or TV programs.

The magnetic switch 42 activates the signal generating device 46 to generate a second signal when the collapsible keyboard returns to the open operation position. The keyboard controller 48 powers on the interrupt request controller 50 according to the second signal and the interrupt request controller 50 sends a second interrupt request to the application.

Figure 5A:
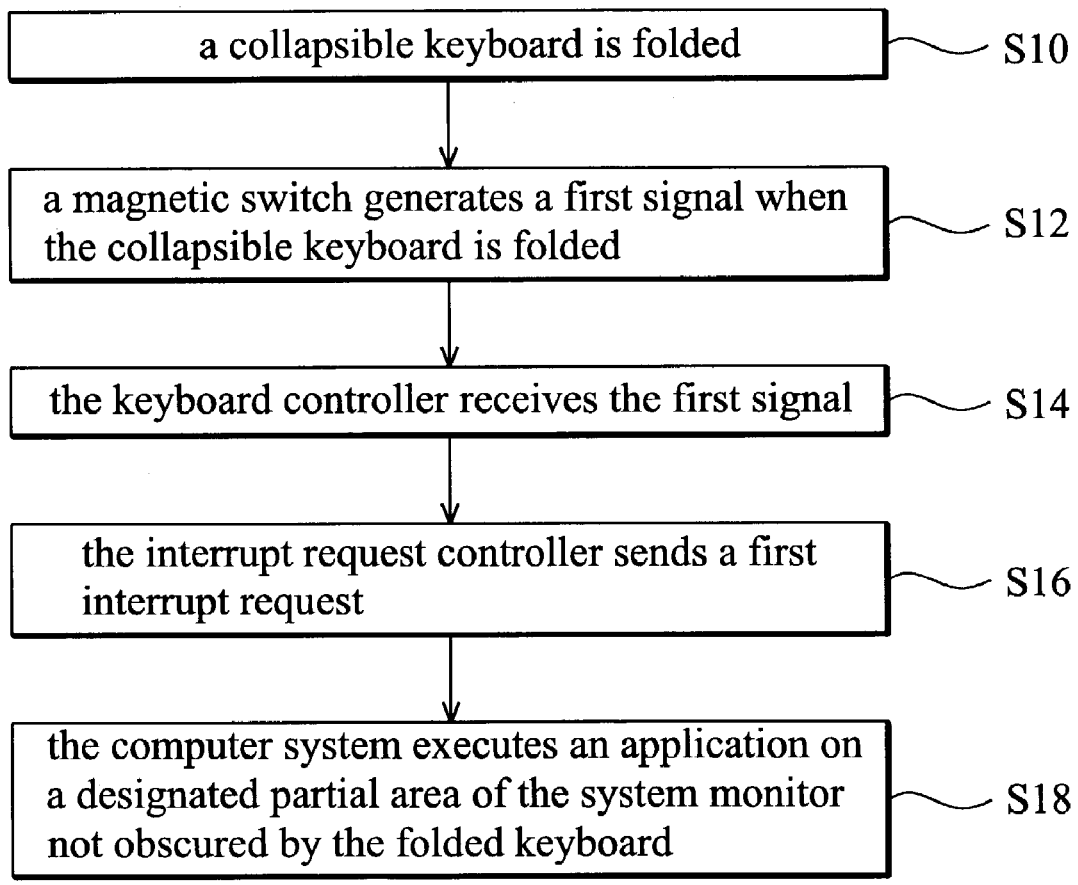
FIG. 5a is a flowchart illustrating a method of processing a collapsible keyboard in a folded position.

FIG. 5a is a flowchart of a method of processing a collapsible keyboard in a folded position.

First, in step S10, a collapsible keyboard is folded, and may obscure part of the system monitor. In step S12, a magnetic switch generates a first signal when the collapsible keyboard is folded. In Step S14, the keyboard controller receives the first signal, recognizing that the collapsible keyboard has been folded, and powers on an interrupt request controller. In step S16, the interrupt request controller sends a first interrupt request, instructing the CPU to stop executing any active applications. Finally in step S18, the computer system executes an application on a designated partial area of the system monitor not obscured by the folded keyboard.

Figure 5B:
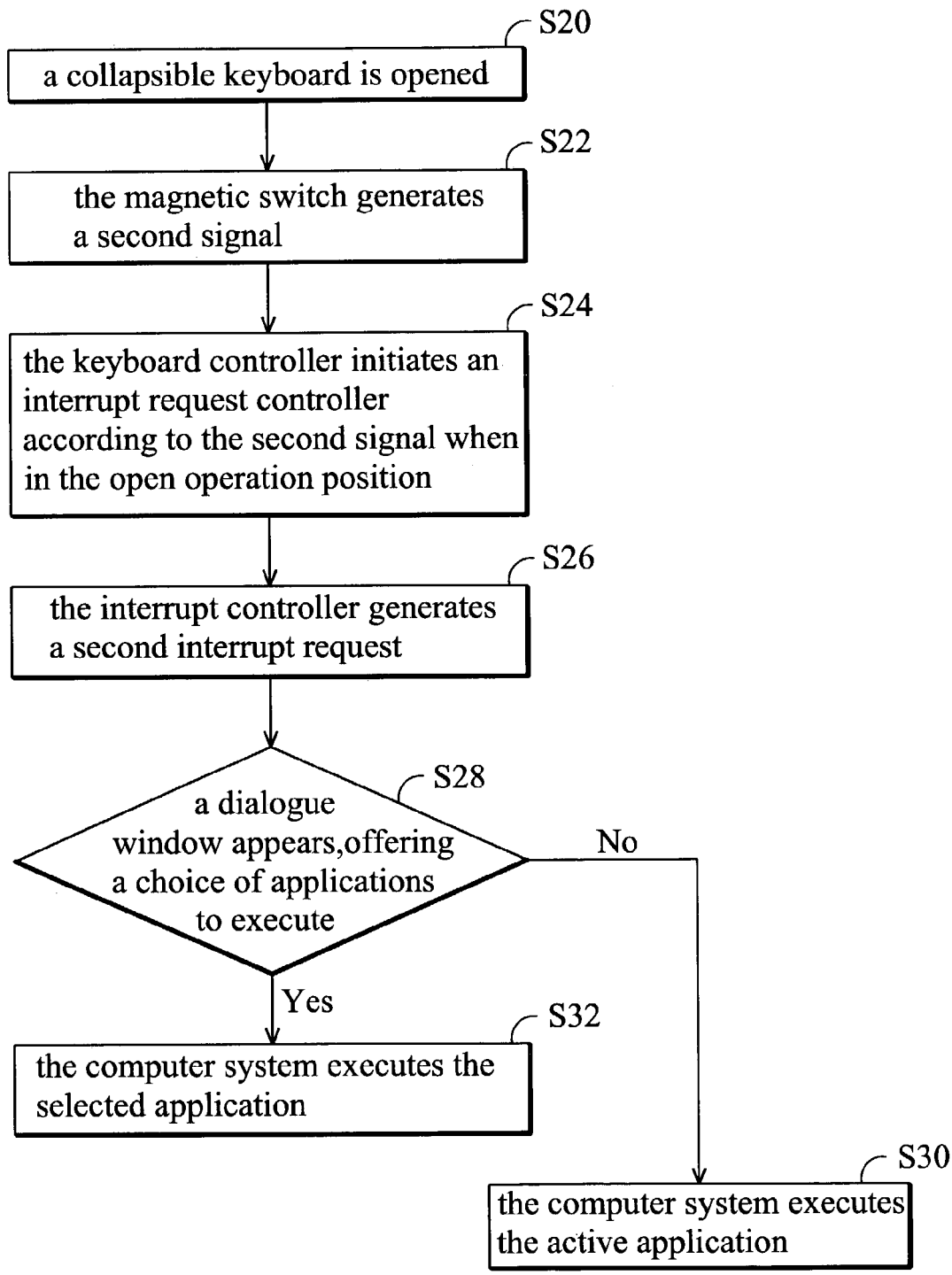
FIG. 5b is a flowchart illustrating a method of processing a collapsible keyboard in an open operating position.

FIG. 5b is a flowchart of a method of processing a collapsible keyboard in an open operating position.

First in step S20, a collapsible keyboard is opened, providing power to the magnetic switch. In step S22, the magnetic switch generates a second signal, received by a keyboard controller. In step S24, the keyboard controller initiates an interrupt request controller according to the second signal when in the open operation position. In step S26, the interrupt controller generates a second interrupt request. A CPU ends an active application and subsequently executes a new application. In step S28, a dialogue window appears, offering a choice of applications to execute. In step S30, the computer system executes the active application. In step S32, the computer system executes the selected application.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A computer system, comprising
   a main body for storing at least an application;
   a monitor coupled to the main body;
   a keyboard coupled to the main body, disposable in at least an open operating position and a folded position, wherein, when disposed in the folded position, the keyboard covers a first partial area of the monitor and leaves uncovered a second partial area of the monitor;
   a signal generating device coupled to the keyboard and the main body to generate a first signal when the keyboard is in the folded position;
   a keyboard controller integrated into the main body for receiving the first signal, determining that the keyboard has been folded; and
   an interrupt request controller in the main body coupled to the keyboard controller to send an interrupt request when the keyboard is folded, terminating active applications, and executing and displaying a new application on the second partial area of the monitor.

2. The computer system as claimed in claim 1, wherein the signal generating device comprises a magnetic switch-activated when the keyboard is folded, the magnetic switch then generating a first signal.

3. The computer system as claimed in claim 1, wherein the signal generating device generates a second signal when the keyboard is opened, according to the second signal activating the interrupt request controller, which issues a second interrupt request to the application.

4. The computer system as claimed in claim 1, wherein a remote controller is used to switch and control applications.

5. A method of processing a keyboard and alternate display functions, comprising:
   providing a computer system with a monitor and a keyboard, disposable in at least an open operating position and a folded position, wherein, when disposed in the folded position, the keyboard covers a first partial area of the monitor and leaves uncovered a second partial area of the monitor;
   generating a first signal when the keyboard is folded;
   a keyboard controller receiving the first signal;
   the keyboard controller starting an interrupt request controller and, according to the first signal, determining that the keyboard has been folded;
   the interrupt request controller sending a first interrupt request to stop any active applications in the computer system; and
   when the keyboard is folded, executing and displaying a new application on the second partial area of the monitor.

6. The method as claimed in claim 5, wherein generating the first signal further comprises:
   activating a magnetic switch when the keyboard is folded; and
   the magnetic switch generating the first signal.

7. The method as claimed in claim 5 further comprising:
   generating a second signal when the keyboard is opened;
   the keyboard controller starting the interrupt request controller, according to the second signal determining that the keyboard has been opened; and
   sending a second interrupt request to the application.

8. The method as claimed in claim 7, further comprising:
   when the keyboard is opened, displaying a dialogue window comprising choices of applications to be executed on the monitor; and
   the dialogue window, according to user input, executing one of the applications.

9. The method as claimed in claim 5, wherein a remote controller is used to switch and control applications.

10. The computer system as claimed in claim 1, wherein the keyboard is collapsible.

11. The computer system as claimed in claim 1, wherein, when disposed in the open operating position, the keyboard leaves uncovered the entire monitor.

12. The computer system as claimed in claim 1, wherein, when disposed in the folded position, applications are only displayed in the second partial area of the monitor.

13. The method as claimed in claim 5, wherein the keyboard is collapsible.

14. The method as claimed in claim 5, wherein, when disposed in the open operating position, the keyboard leaves uncovered the entire monitor.

15. The method as claimed in claim 5, wherein, when disposed in the folded position, applications are only displayed in the second partial area of the monitor.

* * * * *